3,404,698
FLUID CHARGING VALVE
Dorch Rouse, Alexandria, Va., assignor to the United States of America as represented by the Secretary of the Navy
Filed May 26, 1965, Ser. No. 459,137
1 Claim. (Cl. 137—68)

ABSTRACT OF THE DISCLOSURE

A fluid charging valve for a receiver having a blow-out disc which is exposed to the filling pressure and limits the filling pressure by rupture. Closing of the charging valve seals the blow-out disc from the internal pressure of the receiver so that a system of which the receiver is part may operate at a higher pressure than the filling pressure.

---

Figure 1:
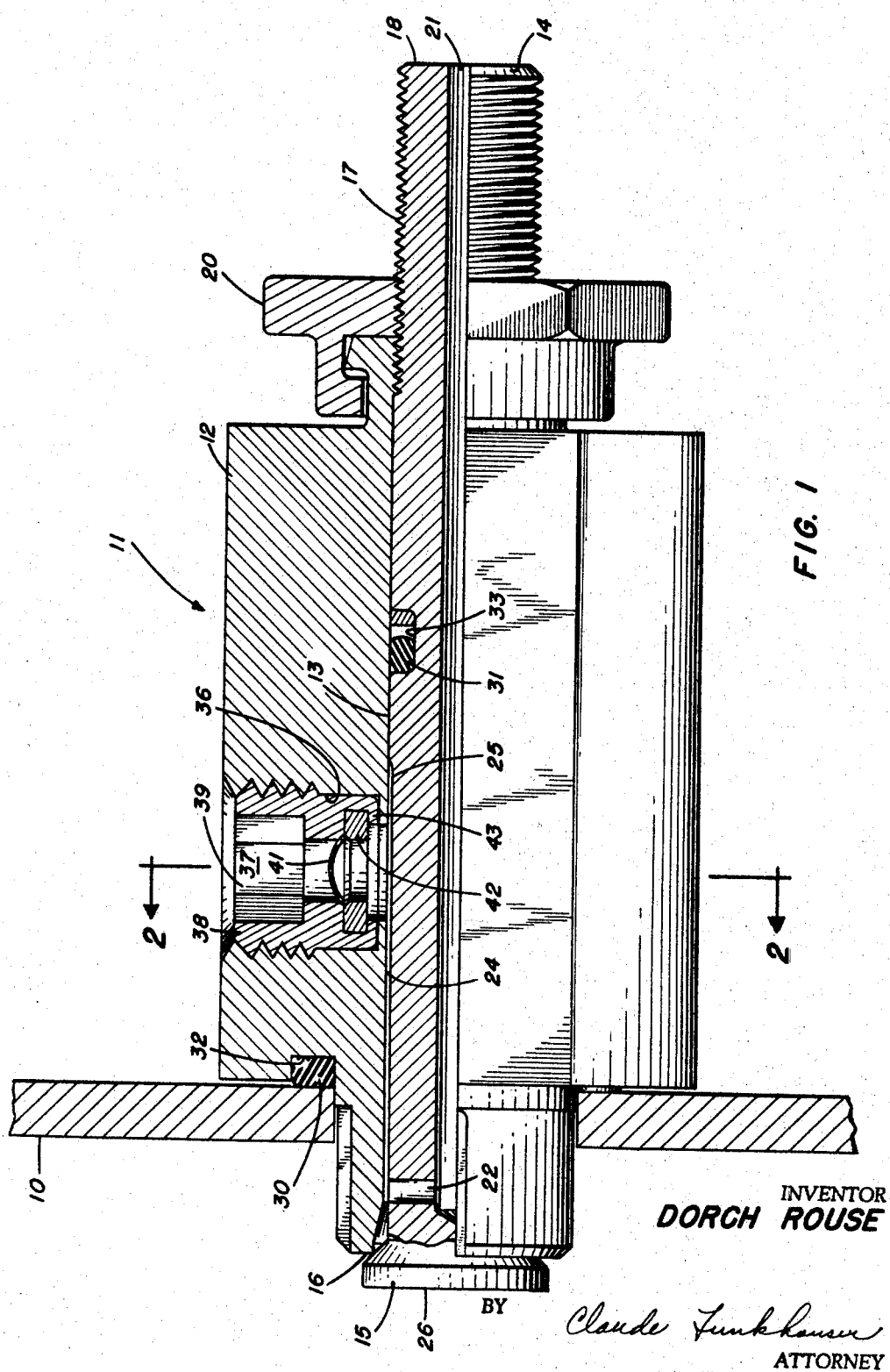

The invention described herein may be manufactured and used by or for the Government of the United States of America for governmental purposes without the payment of any royalties thereon or therefor.

The present invention relates generally to improvements in fluid charging valves and more particularly to a fluid filling valve having an improved pressure relief feature.

It is not uncommon in the field of fluid pressure systems to have a situation wherein normal operating pressures are greatly in excess of maximum filling pressures. In aircraft, for example, receivers which are charged during routine ground maintenance periods may, under normal operating conditions, be subjected to high temperatures as in the accumulators of hydraulic systems, or subjected to high shock loads as in the case of landing gear strut systems. It can be seen that the operating pressures experienced in these situations are a function of lower filling pressures which, if excessive, may result in system failure.

It has been the continuing concern of fluid system designers, therefore, to take every step possible to insure that their systems are incapable of being overpressurized at filling. Their task has been aggravated by the fact that under ordinary circumstances there are multiple sources of fluid available to the operator for filling a particular system, many of which are below maximum operating levels, but above maximum filling levels. The deleterious consequences from connecting to such a fluid source are obvious.

Among the present means for avoiding such system overpressurization are variable design filling fittings which are mated and, therefore, restricted to use with only one pressure source, color coding of the source to correspond with the receiver fitting, and other devices all of which are either inadequate operationally or economically prohibitive.

It is an object of the present invention, therefore, to provide a pressure relief device for fluid filling valves which eliminates the possibility of overcharging fluid systems.

Another object of the present invention is the provision of pressure relief means which are simple to manufacture and which may be used as part of or in conjunction with fluid filling valves.

A further object of the present invention is to provide a pressure relief means integral with fluid filling valve structure so as to achieve clean design and economy with respect to weight and size.

A still further object of the present invention is to provide a fluid system filling valve pressure relief means which is readily adaptable for use over a wide range of desired system pressures.

According to the present invention, the foregoing and other objects are attained by providing a fluid filling valve for filling a fluid system with a pressure relief device which is located so as to be subject to filling pressures, but isolated from system pressures during normal system operations.

Figure 2:
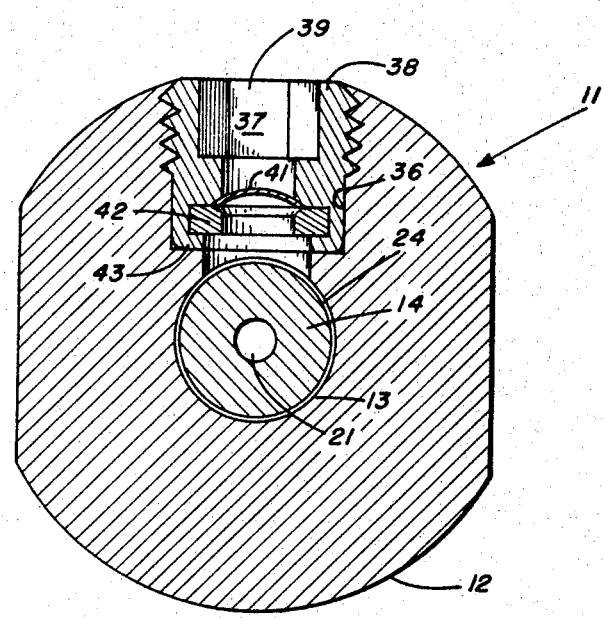

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 shows a plan view, partly in section, of a preferred embodiment of the invention; and FIG. 2 shows a section of the invention taken on line 2—2 of FIG. 1.

Referring to the drawing in detail, there is shown a receiver 10 for storing pressurized fluids having a filling valve 11 in accordance with the present invention rigidly attached thereto.

The valve 11 has a body 12 with a passage 13 formed axially throughout its length. An elongate stem 14 is disposed in the passage 13. The stem has a disc 15 formed on one end to coact with a seat 16 on the body 12 and a threaded portion 17 on the opposite, or inlet, end 18 which coacts with an operating nut 20 rotatably mounted on body 12. Rotation of the operating nut 20 displaces the stem axially thereby seating or unseating disc 15, as the case may be, for stopping or regulating flow of fluid through the valve.

Stem 14 has an axial passage 21 formed substantially along its entire length and a radial passage 22 communicating therewith and extending to a fluid chamber 24. The fluid chamber 24 is defined by the wall of passage 13 and the reduced diameter portion 25 formed on the stem 14 at discharge end 26 of the valve, best seen in FIG. 2. The valve assembly is sealed against fluid leakage by sealing rings 30 and 31 mounted in annular grooves 32 and 33, respectively, formed in valve body 12 and stem 14, respectively.

The valve body 12 is provided with a partially threaded radial bore 36 for receiving a pressure relief device 37. The pressure relief device 37 consists of a set screw member 38 threadedly mounted in bore 36 and having an axial opening 39 formed throughout its entire length. A frangible diaphragm 41 is mounted in opening 39 of member 38 and secured by a sealing ring 42 held rigidly in place by crimped lower edges 43 formed on member 38.

It is readily seen, therefore, that when source pressure is supplied to the fluid inlet end 18 of valve 11, the pressure is transmitted via passageways 21 and 22 into chamber 24 to bore 36 wherein an outwardly directed force is exerted upon the pressure relief device 37. When the valve 11 is opened by rotation of the stem operating nut 20 causing the stem 14 to move axially toward fluid discharge end 26, fluid flows into receiver 10, while filling pressure is still maintained upon the pressure relief device 37. Upon completion of the filling operation, the valve is closed by counter-rotation of the stem operating nut 20 until valve disc 15 is firmly seated against seat 16. Thus, once the valve is securely closed, the pressure relief means 37 is isolated from the receiver and not subject to pressure variations which may occur during normal system operations. It will be apparent to one skilled in the art that if at any time during filling the design pressure of frangible diaphragm 41 is exceeded, rupture will occur and the system will be relieved of the excess pressure thereby to preclude damage or injury.

Frangible diaphragms of predetermined diverse design pressures can be used thus allowing the same basic filling valve to be used for a wide range of filling pressures. Further, rupture of the frangible diaphragm does not permanently disable the filling valve since the pressure relief means is replacable either by replacing the diaphragm itself or by replacing the entire element. It is to be further noted that the pressure relief device may be located remote from the valve, if desired, so long as the pressure sensing source is isolated from receiver pressures under ordinary operating conditions.

It should be understood that the foregoing disclosure relates to only a preferred embodiment of the invention and that numerous modifications or alterations may be made without departing from the spirit and the scope of the invention as set forth in the appended claim.

What is claimed is:

1. A fluid charging valve for a receiver comprising:
 a valve body of cylindrical shape secured to the receiver, said body being formed with a reduced cylindrical portion on the inner end and carry an operating nut rotatably attached to the outer end, said cylindrical body having a longitudinal bore extending its full length including the reduced cylindrical portion at the inner end and a radial bore communicating with said longitudinal bore, said inner end reduced portion extending into the receiver and formed at its extremity with a valve seat;
 a tube like stem fitting said longitudinal bore, said stem being threaded at its outer end to engage said valve body carried operating nut for movement along the longitudinal axis of the body upon rotation of the nut, said stem being formed at its inner end with a disc face for engagement with the valve seat of the reduced end portion, said stem being further formed with a portion of reduced diameter adjacent its inner end, said reduced portion extending from the disc face to beyond and communicating with the radial bore of the valve body;
 a replaceable plug having an internal bore threaded into the radial bore; and
 a blow-out disc sealing the internal bore of the plug;
 whereby the receiver is filled through the tube like stem, the filling pressure being exerted on the blow-out plug through the reduced portion and the bore of the plug and when the receiver is filled the internal pressure of the receiver is sealed off from the blow-out disc by closing the disc inner end of the stem on the valve seat of the reduced portion of the valve body.

References Cited

UNITED STATES PATENTS

| 138,421 | 4/1873 | Matthews | 137—588 X |
| 781,038 | 1/1905 | Warren | 141—374 |
| 2,552,110 | 5/1951 | Otis et al. | 220—89 |

FOREIGN PATENTS 705,689  3/1965  Canada.

WILLIAM F. O'DEA, *Primary Examiner.*

R. GERARD, *Assistant Examiner.*